United States Patent
Nance

(10) Patent No.: US 11,007,831 B2
(45) Date of Patent: May 18, 2021

(54) VEHICLE TRAILER HITCH ASSEMBLY

(71) Applicant: B & W CUSTOM TRUCK BEDS, INC., Humboldt, KS (US)

(72) Inventor: Steve Nance, Suwanee, GA (US)

(73) Assignee: B & W CUSTOM TRUCK BEDS, INC., Humboldt, KS (US)

( * ) Notice: Subject to any disclaimer, the term of this patent is extended or adjusted under 35 U.S.C. 154(b) by 187 days.

(21) Appl. No.: 16/101,752

(22) Filed: Aug. 13, 2018

(65) Prior Publication Data

US 2019/0070917 A1 Mar. 7, 2019

Related U.S. Application Data

(60) Provisional application No. 62/553,304, filed on Sep. 1, 2017.

(51) Int. Cl.
*B60D 1/52* (2006.01)
*B60D 1/06* (2006.01)
*B60D 1/58* (2006.01)

(52) U.S. Cl.
CPC ............. *B60D 1/52* (2013.01); *B60D 1/06* (2013.01); *B60D 1/58* (2013.01)

(58) Field of Classification Search
CPC .............. B60D 1/52; B60D 1/06; B60D 1/28
USPC .................. 280/491.5, 495, 490.1, 511, 507; 403/354, 374.5
See application file for complete search history.

(56) References Cited

U.S. PATENT DOCUMENTS

| | | | | |
|---|---|---|---|---|
| 33,899 | A | * | 12/1861 | Morrill |
| 1,465,168 | A | * | 8/1923 | Morris ..................... B60D 1/00 |
| | | | | 280/510 |
| 1,475,257 | A | * | 11/1923 | Bottone ............ H01R 13/6277 |
| | | | | 403/321 |
| 2,288,004 | A | * | 6/1942 | Lauderdale ............. B23B 29/04 |
| | | | | 82/161 |
| 2,639,160 | A | * | 5/1953 | Studebaker ............... B60D 1/52 |
| | | | | 280/495 |
| 3,285,668 | A | * | 11/1966 | Fearon .................... E21C 35/19 |
| | | | | 299/109 |
| 3,751,115 | A | * | 8/1973 | Proctor ................... E21C 35/19 |
| | | | | 299/109 |
| 3,814,462 | A | * | 6/1974 | Kelly ................... B62K 15/006 |
| | | | | 280/287 |

(Continued)

FOREIGN PATENT DOCUMENTS

EP 0301153 A1 * 2/1989 ............... B60D 1/52
EP 0301153 A1 2/1989

*Primary Examiner* — Anne Marie M Boehler
(74) *Attorney, Agent, or Firm* — Erickson Kernell IP, LLC; Kent R. Erickson

(57) ABSTRACT

Hitch assemblies are provided. The hitch assemblies includes a first body defining a receiving cavity and a locking mechanism, and a second body removably insertable into the receiving cavity of the first body. The first body is fixedly attachable to a vehicle and the second body is configured to operably connect to a trailing structure, and the locking mechanism includes a rotating member extending through the receiving cavity and rotatable between a first position and a second position, wherein, when the second body is positioned within the receiving cavity and the rotating member is in a secured position, the rotating member secures the second body to the first body.

7 Claims, 8 Drawing Sheets

(56) References Cited

U.S. PATENT DOCUMENTS

| | | | | |
|---|---|---|---|---|
| 3,871,777 | A * | 3/1975 | Sauer | B26D 7/20 |
| | | | | 403/20 |
| 5,242,186 | A * | 9/1993 | Pettersson | B60D 1/52 |
| | | | | 280/491.5 |
| 5,690,445 | A * | 11/1997 | Wu | B23B 31/103 |
| | | | | 403/13 |
| 6,860,503 | B2 | 3/2005 | Aufderheide et al. | |
| 7,216,886 | B2 | 5/2007 | Rimmelspcher et al. | |
| 7,559,570 | B2 * | 7/2009 | Cearns | B60D 1/46 |
| | | | | 280/490.1 |
| 7,604,249 | B2 | 10/2009 | Gentner et al. | |
| D610,051 | S | 2/2010 | Tambornino | |
| D610,493 | S | 2/2010 | Tambornino | |
| D610,954 | S | 3/2010 | Tambornino | |
| 7,699,335 | B2 | 4/2010 | Riehle et al. | |
| D623,098 | S | 9/2010 | Tambornino | |
| D623,561 | S | 9/2010 | Tambornino | |
| D623,563 | S | 9/2010 | Tambornino | |
| 8,016,314 | B2 | 9/2011 | Visser | |
| 8,328,224 | B1 | 12/2012 | Alsaid | |
| 8,573,629 | B1 * | 11/2013 | Kraai | B60D 1/1675 |
| | | | | 280/491.4 |
| 8,720,932 | B2 | 5/2014 | Kim et al. | |
| 9,150,061 | B2 | 10/2015 | Riehle et al. | |
| 9,150,068 | B2 | 10/2015 | de Kock et al. | |
| D795,756 | S * | 8/2017 | McCuskey | D12/162 |
| 9,744,821 | B2 | 8/2017 | Mutlu et al. | |
| 10,406,872 | B2 | 9/2019 | Scheips et al. | |
| 10,479,151 | B2 | 11/2019 | Brinkmann et al. | |
| 2007/0290483 | A1 * | 12/2007 | Visser | B60D 1/60 |
| | | | | 280/507 |
| 2010/0109286 | A1 * | 5/2010 | Visser | B60D 1/52 |
| | | | | 280/477 |
| 2017/0015162 | A1 * | 1/2017 | Walter | B60D 1/06 |
| 2018/0056739 | A1 * | 3/2018 | Robinson | B60D 1/167 |
| 2018/0162185 | A1 | 6/2018 | Krohn | |
| 2019/0070917 | A1 | 3/2019 | Nance | |
| 2019/0120419 | A1 | 4/2019 | Goulet | |
| 2019/0126700 | A1 | 5/2019 | Belinky et al. | |
| 2019/0270354 | A1 | 9/2019 | Angermann et al. | |
| 2020/0001672 | A1 | 1/2020 | Sanchez Lafuente Ayala | |

* cited by examiner

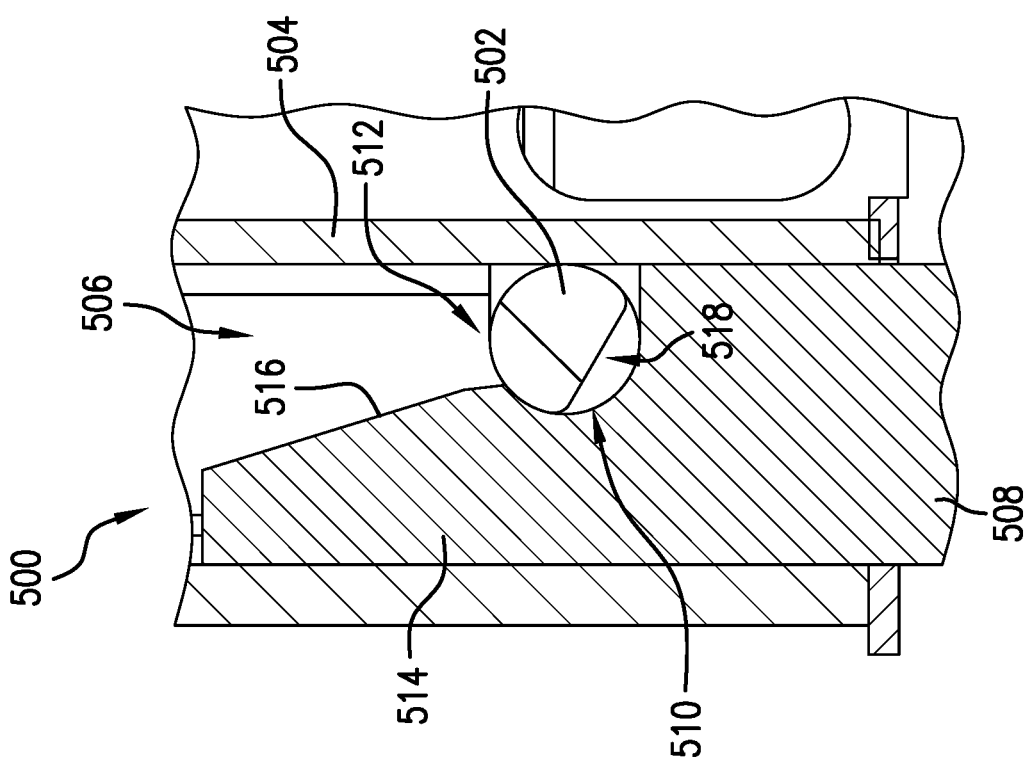
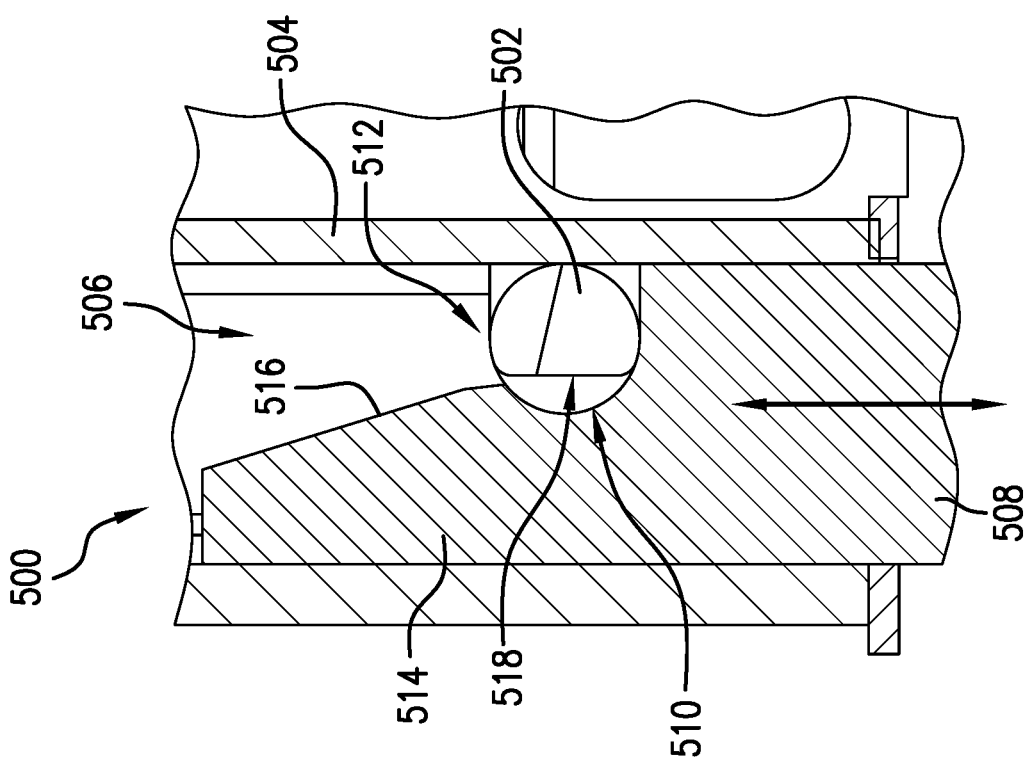

VEHICLE TRAILER HITCH ASSEMBLY

CROSS-REFERENCE TO RELATED APPLICATIONS

The present application claims priority from U.S. Provisional Patent Application No. 62/553,304, filed Sep. 1, 2017. The contents of the priority application are hereby incorporated by reference in their entirety.

BACKGROUND

The subject matter disclosed herein generally relates to trailer hitches for vehicles and, more particularly, to trail hitch assemblies for installation on vehicles.

Hitches are typically used to connect a vehicle and some type of trailing structure, whether wheeled (e.g., trailer, mobile home, etc.) or otherwise (e.g., rack attachments, etc.). Typically, hitches include a square tube receiver that has a loose fitting tube inserted into the square tube receiver with a cross pin to secure the tube insert to the square tube receiver. The square tube receiver is fixedly mounted to a portion of a vehicle. Due to material and/or manufacturing tolerances and a relatively loose fitting securing cross pin, dynamic forces during towing can be imparted to and experienced by the hitch assembly. Such dynamic forces may be particularly strong with starts and stops of a vehicle. It is important to enable safe operation and stopping of a vehicle that has a trailing structure in tow. Further, preventing failure of hitch assemblies and/or towing structures or components is advantageous for product life and safety.

SUMMARY

According to some embodiments, hitch assemblies are provided. The hitch assemblies include a first body defining a receiving cavity and a locking mechanism and a second body removably insertable into the receiving cavity of the first body. The first body is fixedly attachable to a vehicle and the second body is configured to operably connect to a trailing structure. The locking mechanism comprises a rotating member extending through the receiving cavity and rotatable between a first position and a second position, wherein, when the second body is positioned within the receiving cavity and the rotating member is in a secured position, the rotating member secures the second body to the first body, the secured position being between the first position and the second position.

In addition to one or more of the features described herein, or as an alternative, further embodiments of the hitch assembly may include that the second body comprises a first portion and a second portion, wherein the first portion has a first thickness and the second portion has a second thickness that is greater than the first portion.

In addition to one or more of the features described herein, or as an alternative, further embodiments of the hitch assembly may include a third body fixedly connected to the second body, wherein the third body is configured to engage with a portion of the trailing structure.

In addition to one or more of the features described herein, or as an alternative, further embodiments of the hitch assembly may include that the second body and the third body are a unitary component.

In addition to one or more of the features described herein, or as an alternative, further embodiments of the hitch assembly may include the locking mechanism further having a handle operably connected to the rotating member, the handle arranged to enable manual operation of the rotating member from the first position to the second position.

In addition to one or more of the features described herein, or as an alternative, further embodiments of the hitch assembly may include a biasing element arranged between the handle and the rotating member, the biasing element arranged to bias the rotating member toward the first position.

In addition to one or more of the features described herein, or as an alternative, further embodiments of the hitch assembly may include that when the rotating member is in the second position, the second body is moveable into and out of the receiving cavity.

In addition to one or more of the features described herein, or as an alternative, further embodiments of the hitch assembly may include that the rotating member includes a stop pin and the first body includes a blocking aperture, wherein the stop pin is movably positioned within the blocking aperture and the blocking aperture restricts movement of the rotating member by stopping movement of the stop pin at a first end of the blocking aperture.

In addition to one or more of the features described herein, or as an alternative, further embodiments of the hitch assembly may include that when the rotating member is in the first position, the stop pin is in contact with the first end of the blocking aperture.

In addition to one or more of the features described herein, or as an alternative, further embodiments of the hitch assembly may include that the locking mechanism further comprises a lock configured to engage to prevent rotation of the rotating member, and when disengaged, rotation of the rotating member is allowed.

In addition to one or more of the features described herein, or as an alternative, further embodiments of the hitch assembly may include that the lock includes a lock pin removably insertable into a blocking aperture in the first body, wherein when the lock pin is inserted in the blocking aperture, rotation of the rotating member is prevented.

In addition to one or more of the features described herein, or as an alternative, further embodiments of the hitch assembly may include that the second body includes a first portion and a second portion, wherein the first portion includes a tapered first contact surface and a recess and the rotating member includes a second contact surface and an engaging surface.

In addition to one or more of the features described herein, or as an alternative, further embodiments of the hitch assembly may include that when the second body is secured into the first body, the engaging surface is in contact with the recess.

In addition to one or more of the features described herein, or as an alternative, further embodiments of the hitch assembly may include that when the second body is inserted into the receiving cavity of the first body, the first contact surface contacts the second contact surface and rotates the rotating member.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 5C illustrates the rotating member in the second position and the second body inserted completely into the receiving cavity;

FIG. 5D illustrates the rotating member securing the second body to the first body, with the rotating member in a secured position;

DETAILED DESCRIPTION

Figure 1:
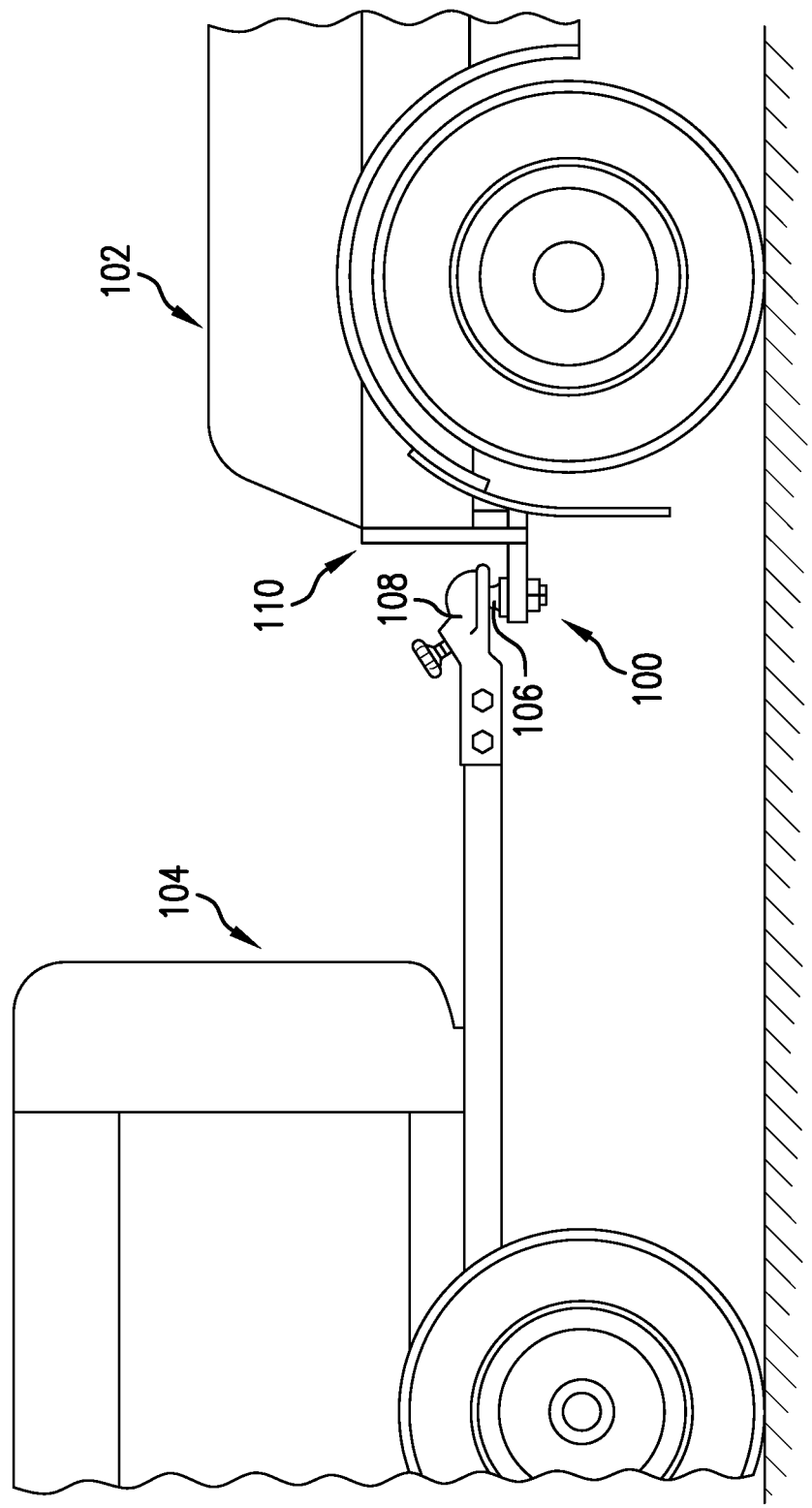
FIG. 1 is a schematic illustration of a prior art hitch assembly configuration.

FIG. 1 illustrates an example of a typical prior art configuration of a hitch assembly 100 that connects a vehicle 102 with a trailing structure 104. As shown, the hitch assembly 100 includes a first engagement portion 106 and a second engagement portion 108. As illustratively shown, the first engagement portion 106 is fixedly connected or attached to the vehicle 102 and the second engagement portion 108 is fixedly connected or attached to the trailing structure 104. The first engagement portion 106 is permanently attached to the vehicle 102 by welding, fasteners, etc. at a rear end 110 of the vehicle 102. The fixed attachment between the first engagement portion 106 and the rear end 110 of the vehicle 102 can be at a frame of the vehicle 102 to ensure proper and secure attachment therebetween, and to enable the vehicle 102 to tow the trailing structure 104.

As will be appreciated by those of skill in the art, the fixed, permanent connection between the first engagement portion 106 with the vehicle 102 may not be desirable for various reasons, such as aesthetics, length extension of the vehicle 102, etc. Accordingly, it may be advantages to enable removal of the first engagement portion 106 (the portion connected to the vehicle 102). However, such ability to remove the first engagement portion 106 may reduce the structural integrity of the first engagement portion 106 and/or the amount of capacity that may be towed by the vehicle 102 when using a removable first engagement portion 106.

Embodiments provided herein are directed to vehicle hitch assemblies that can be, at least partially, removed from a vehicle while maintaining sufficient strength to tow a trailing structure.

Figure 2A:
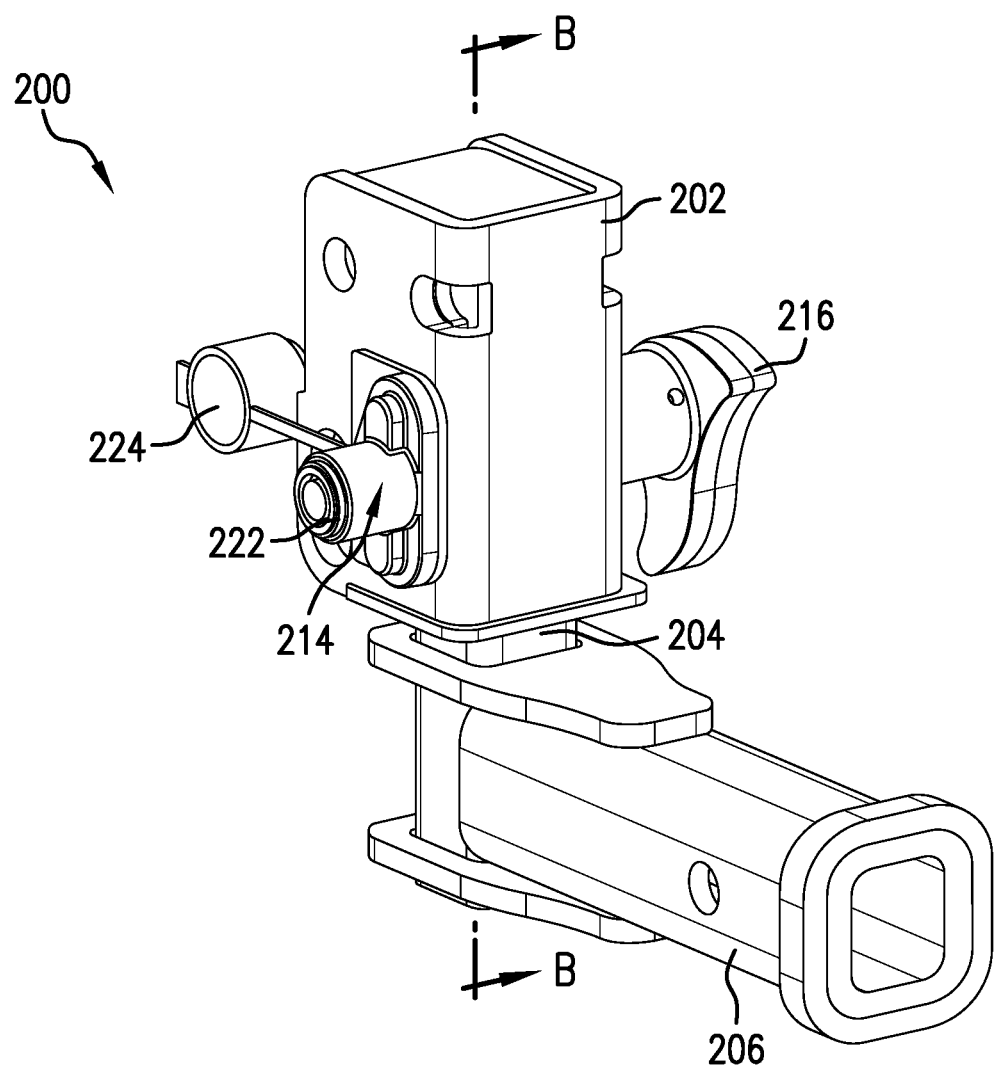
FIG. 2A is an isometric illustration of a hitch assembly in accordance with an embodiment of the present disclosure.
Figure 2B:
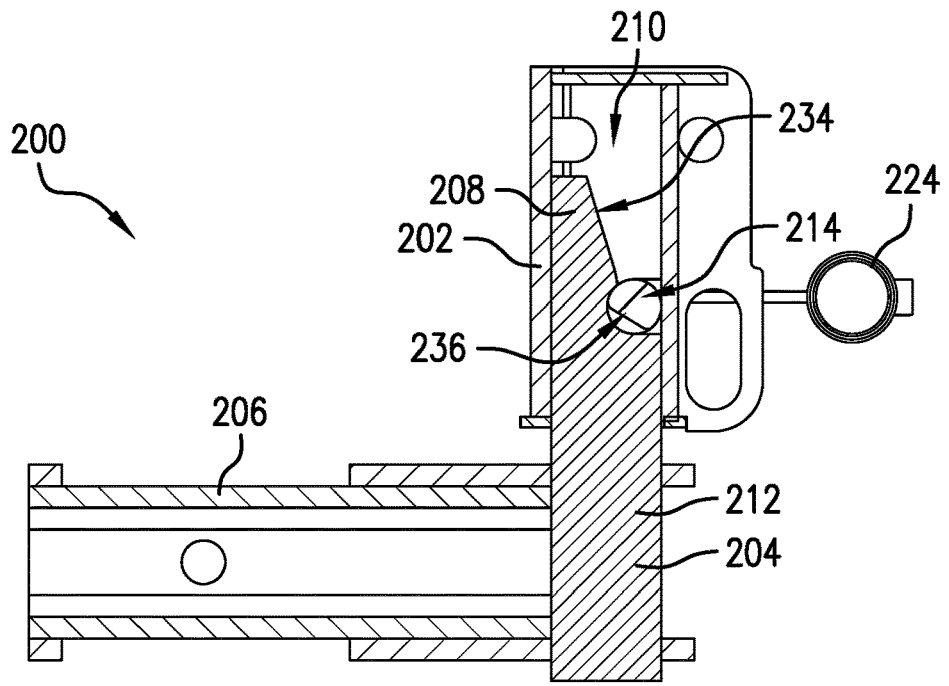
FIG. 2B is a cross-sectional illustration of the hitch assembly as viewed along the line B-B shown in FIG. 2A.
Figure 2C:
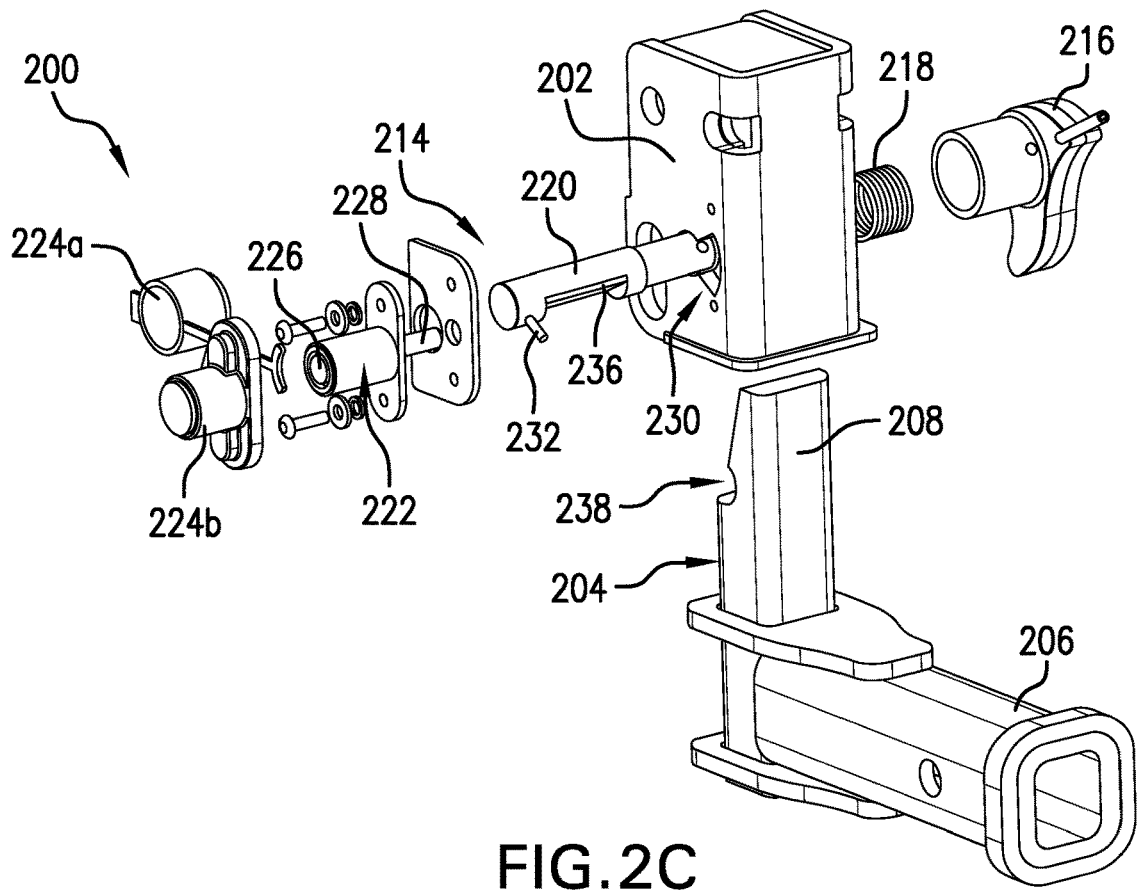
FIG. 2C is a partial exploded illustration of the hitch assembly of FIG. 2A.

Turning now to FIGS. 2A-2C, schematic illustrations of a vehicle hitch assembly 200 in accordance with an embodiment of the present disclosure are shown. FIG. 2A is an isometric illustration of the hitch assembly 200, FIG. 2B is a cross-sectional illustration of the vehicle hitch assembly 200 as viewed along the line B-B shown in FIG. 2A, and FIG. 2C is a partial exploded illustration of the hitch assembly 200. The vehicle hitch assembly 200 is mountable to a vehicle and forms a portion of a first engagement portion (e.g., similar to first engagement portion 106 shown in FIG. 1). However, in contrast, at least a portion of the vehicle hitch assembly 200 is removable, as described herein. In at least one embodiment, a portion of the vehicle hitch assembly 200 is positioned behind a portion of the vehicle, such as the bumper for example.

The vehicle hitch assembly 200 includes a first body 202 and a second body 204 that is removably attachable to the first body 202. The first body 202 is a mounting structure that can be fixedly connected to a portion of a vehicle, and in some embodiments may be permanently or non-removably connected to a frame of a vehicle. As such, the first body 202 includes one or more apertures or other structural features to aid in attachment or connection to a portion of a vehicle (e.g., a vehicle frame). In some embodiments, the first body 202 may not be viewable (e.g. positioned behind a vehicle bumper) unless a person is on or near the ground.

The second body 204 can slide or be inserted into engagement with the first body 202, as described below. The second body 204 further can receive a third body 206 that can include a ball-member or other engagement element or structure to enable engagement with a portion of a hitch on a trailing structure. The third body 206 in the present illustration is a square tube arrangement, but those of skill in the art will appreciate that the third body 206 can be a ball-like structure similar to that shown in FIG. 1. The third body 206 can be fixedly secured to the second body 204. For example, in some embodiments, the third body 206 is welded to the second body 204. Alternatively, in some embodiments, the second body 204 and the third body 206 can be a unitary or single structure.

The second body 204 is insertable into the first body 202. That is, as shown in FIG. 2B, a first portion 208 of the second body 204 is positioned within a receiving cavity 210 of the first body 202. The third body 206 is fixedly connected to a second portion 212 of the second body 204. The first portion 208 of the second body 204 is arranged to be engageable with or by a locking mechanism 214 that is part of the first body 202.

As shown in FIG. 2C, the locking mechanism 214 includes a handle 216, a biasing element 218, a rotating member 220, and a lock 222. The rotating member 220 extends through the first body 202 and operably engages with the first portion 208 of the second body 204. On one end of the rotating member 220 is the handle 216 and the biasing element 218. On the other end of the rotating member 220 is the lock 222. The handle 216 is arranged to enable manual rotation of the rotating member 220 within the first body 202. The biasing element 218 provides a biased engagement between the handle 216 and the rotating member 220 such that the biasing element 218 urges the rotating member 220 toward a first position and applied force can urge the rotating member 220 against the biasing element 218 to move into a second position. The second position is a position of the rotating member 220 rotated about an axis of the rotating member 220 with respect to the first position, as described below.

On the opposing side of the rotating member 220 is the lock 222. The lock 222 includes a keyway 226 or other key-enabled mechanism to enable locking/unlocking of the lock 222. The lock 222 may be biased outward or away from the first body 202 such that a lock pin 228 can disengage from a blocking aperture 230 in the first body 202. In some embodiments, the key used within the keyway 226 can be used to pull the lock pin 228 out of the blocking aperture 230. When the lock 222 is locked, the lock pin 228 is inserted into the blocking aperture 230 of the first body 202. When the lock pin 228 is positioned within the blocking aperture 230, the lock pin 228 prevents rotation of the rotating member 220. A lock cap 224a is optionally included to protect the keyway 226 of the lock 222. As will be appreciated by those of skill in the art, the lock cap 224a may be arranged to engage with or compression fit with a lock shroud 224b that surrounds and protects the lock 222.

The rotating member 220 includes a stop pin 232 that is arranged to be movable within the blocking aperture 230. However, when the lock pin 228 is positioned within the blocking aperture 230, the stop pin 232 cannot rotate or move within the blocking aperture 230, and thus rotation of the rotating member 220 is prevented. Accordingly, when the lock pin 228 is positioned within the blocking aperture 230, the handle 216 cannot rotate the rotating member 220. However, when the lock pin 228 is removed from the blocking aperture 230, the stop pin 232 is free to rotate or move within the blocking aperture 230, and thus the rotating member 220 can be rotated by operation of the handle 216.

The rotating member 220 engages with the first portion 208 of the second body 204. In this embodiment, the first portion 208 of the second body includes a first contact surface 234 and the rotating member 220 includes a second contact surface 236. The second contact surface 234 of the rotating member 220 enables the first portion 208 of the second body 204 to move into and out of engagement with the first body 202. In operation, a first contact surface 234 of the second body 204 can slide into contact with the second contact surface 234 of the rotating member 220 to rotate the rotating member 220 and allow the second body 204 to slide into engagement with the first body 202. The second body 204 includes a recess 238 that is configured to receive the rotating member 220 to secure the second body 204 to the first body 202. That is, the recess 238 is arranged to receive and retain the rotating member 220. When the rotating member 220 is in a secured position, the rotating member 220 engages with the recess 238 to thus retain the rotating member 220 to the first body 202.

Figure 3:
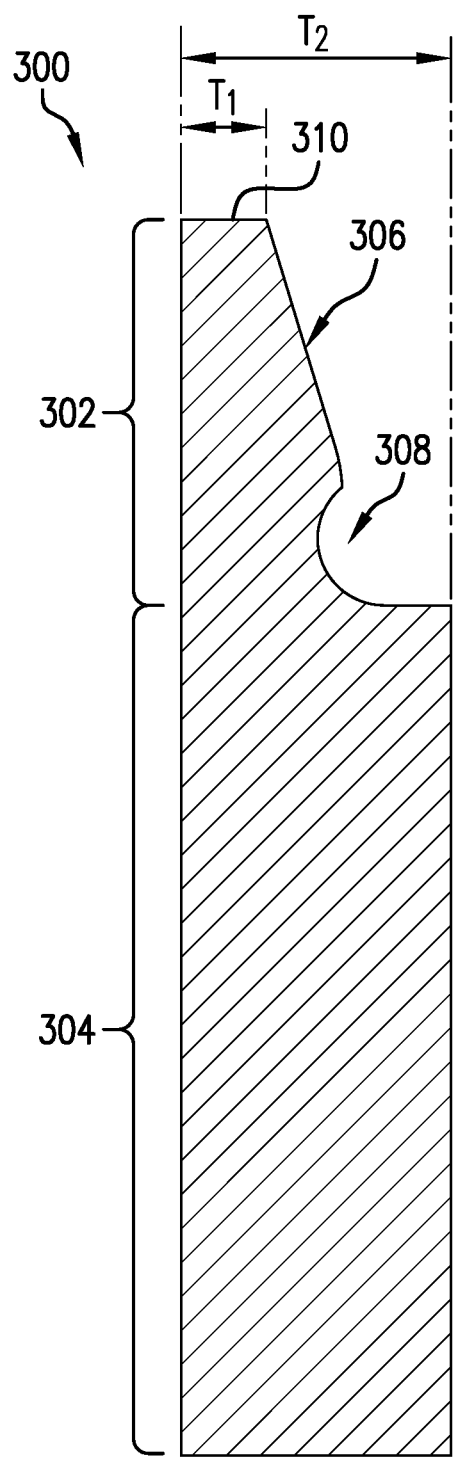
FIG. 3 is a schematic illustration of a second body of a hitch assembly in accordance with an embodiment of the present disclosure.

Turning now to FIG. 3, a schematic illustration of second body 300 in accordance with an embodiment of the present disclosure is shown. The second body 300 is similar to that shown and described above. That is, the second body 300 is arranged to be inserted into and/or otherwise engage with a first body, the first body being fixedly connected to a vehicle. Further, a third body can be fixedly connected to or integrally formed with the second body 300.

As shown, the second body 300 includes a first portion 302 and a second portion 304. The first portion 302 of the second body 300 is arranged to be positioned within a receiving cavity of a first body, as shown and described above. The first portion 302 of the second body 300 is arranged to be engageable with or by a locking mechanism that is part of the first body.

The first portion 302 of the second body 300 is shaped to enable releasable engagement with a locking mechanism of the first body (e.g., a rotating member). The first portion 302 includes a tapered, first contact surface 306 and a recess 308. The first contact surface 306 is angled such that an end 310 of the first portion 302 has a first thickness $T_1$ that is less than a second thickness $T_2$ of the second portion 304. The first portion 302 tapers outward (or thickens) along the first contact surface 306 from the first thickness $T_1$ toward the second portion 304, with the tapering, first contact surface 306 ending at the recess 308. The second body 300 interacts with a rotating member 400 (shown in FIG. 4) that is part of a locking mechanism (e.g., locking mechanism 214 shown in FIGS. 2A-2C).

Figure 4:
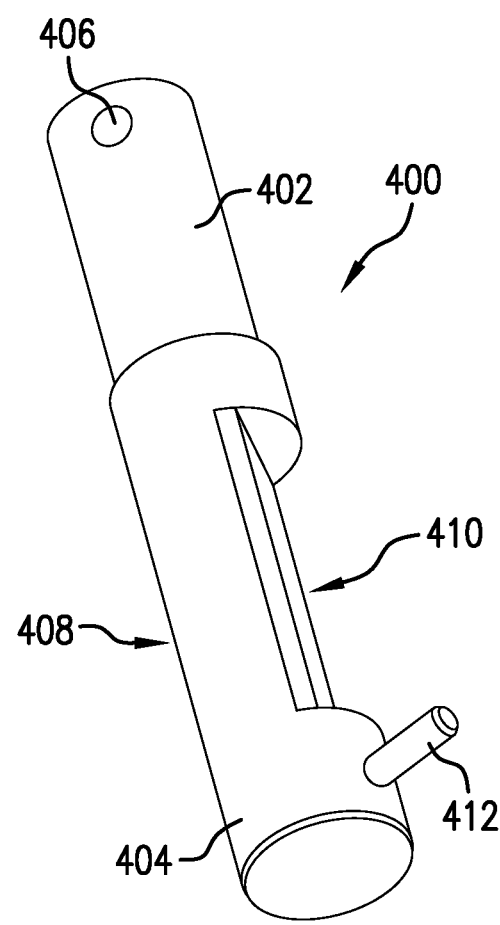
FIG. 4 is an isometric illustration of a rotating member of a hitch assembly in accordance with an embodiment of the present disclosure.

Turning to FIG. 4, the rotating member 400 is shown in an isometric illustration. The rotating member 400 is a substantially cylindrical body that extends from a handle portion 402 to a securing portion 404. The rotating member 400 can be operable within a first body of a hitch assembly, as shown and described above. The rotating member 400 can be rotatably housed within a first body to enable operation of the hitch assembly.

The handle portion 402 of the rotating member 400 can be operably connected to a biasing element and/or handle to enable manual rotation of the rotating member 400. Although shown with the handle portion 402 having a smaller dimension than the securing portion 404, such relative dimensions are not to be limiting, and in some embodiments, the handle portion 402 and the securing portion 404 can have the same dimension, or the handle portion 402 can be the large dimensioned portion of the rotating member 400.

As shown, the handle portion 402 has a handle aperture 406. The handle aperture 406 can enable the rotating member 400 to operably connect to a handle. For example, a portion of a biasing element or element (e.g., a spring) can be engaged within the handle aperture 406 to enable both biasing toward a first position and enabling a handle to be used to rotate the rotating member 400. A handle operably connected to the handle portion 402 of the rotating member 400 enables manual rotation of the rotating member 400 to rotate the rotating member 400 from a first position to a second position (e.g., as shown in FIGS. 5A-5B).

The securing portion 404 includes an engaging surface 408 and a second contact surface 410 that is arranged to operate with the first portion 302 of the second body 300. In operation, when the first contact surface 306 of the second body 300 contacts the second contact surface 410 of the rotating member 400, the second body 300 can apply force to urge the rotating member 400 to rotate the second contact surface 410, the force applying against the force of the biasing element. The rotating member 400 thus rotates from a first position to a second position. When the rotating member 400 is in the second position, the first portion 302 of the second body 300 can move past the rotating member 400 and allow for the recess 308 to receive the rotating member 400. When the rotating member 400 is seated within the recess 308, the biasing element urges the rotating member back toward the first position, and thus the engaging surface 408 of the rotating member 400 engaged with the recess 308 to securely hold the second body 300. When the rotating member 400 is engaged with the recess 308, the rotating member 400 is in the secured position.

As shown, the rotating member 400 also includes a stop pin 412. The stop pin 412 may sit within a blocking aperture of the first body (e.g., as shown and described herein). The movement of the stop pin 412 within the blocking aperture limits the rotation of the rotating member 400. When the rotating member 400 is in the first position, the stop pin 412 is located against one end of the blocking aperture.

Figure 5B:
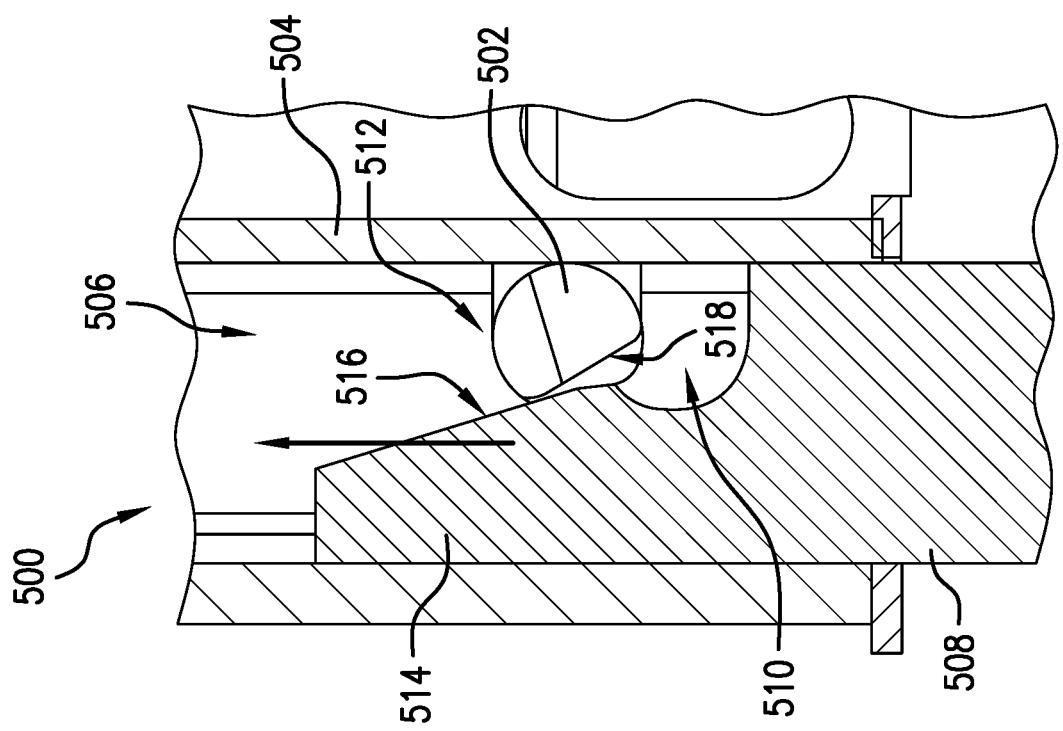
FIG. 5B illustrates the rotating member as urged toward a second position by a portion of a second body.
Figure 5A:
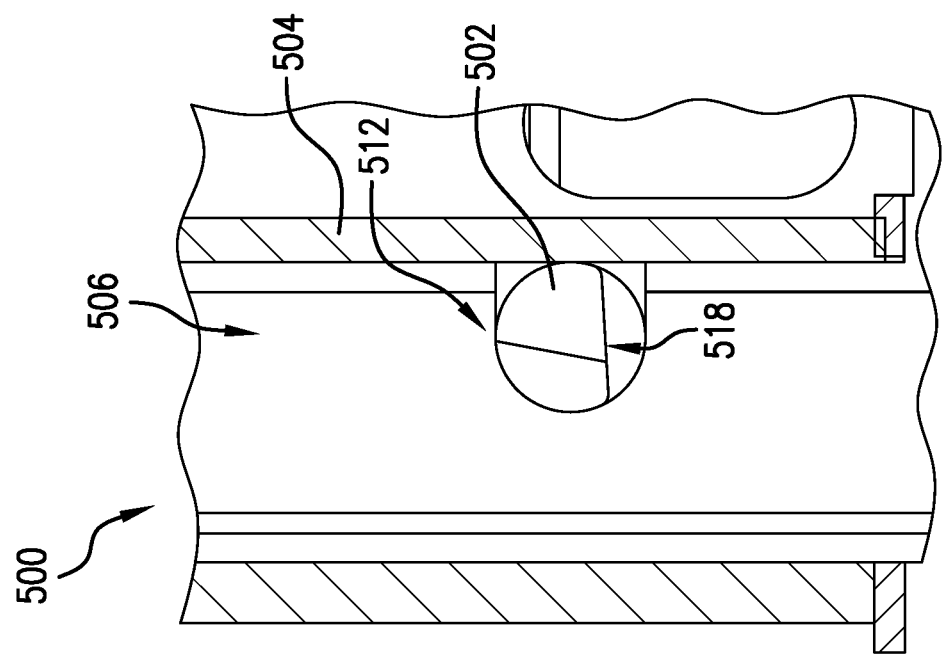
FIG. 5A illustrates a rotating member of an embodiment of the present disclosure within a first body having a receiving cavity, the rotating member being in a first position.

Turning now to FIGS. 5A-5D, schematic partial cross-sectional illustrations of a hitch assembly 500 in accordance with an embodiment of the present disclosure are shown. FIG. 5A illustrates a rotating member 502 within of a first body 504 having a receiving cavity 506, the rotating member 502 being in a first position. FIG. 5B illustrates the rotating member 502 of the hitch assembly 500 as urged toward a second position by a portion of a second body 508. FIG. 5C illustrates the rotating member 502 in the second position and the second body 508 inserted completely into the receiving cavity 506. FIG. 5D illustrates the rotating member 502 securing the second body 508 to the first body 504. The rotating member 502 is part of a locking mechanism of the first body 504 and the rotating member 502 is rotatable within the first body 504 by operation of a handle, e.g., as shown and described above. The rotating member 502 is biased or urged toward the first position (FIG. 5A) by a biasing element and force can be applied to the rotating member 502 to rotate from the first position to the second position (FIG. 5B). The force applied to the rotating member 502 can be applied by a portion of the second body 508 and/or by manual operation of a handle operably connected to the rotating member 502.

As shown in FIG. 5A, the rotating member 502 includes a second contact surface 518 and an engaging surface 512. The second contact surface 518 is angled such that when the second body is inserted into the receiving cavity 506, a first contact surface 516 of the second body 508 can contact the second contact surface 518 and apply a force to rotate the rotating member 502, as shown in FIG. 5B. The receiving cavity 506 is shaped to receive a first portion 514 of the second body 508.

As shown in FIG. 5B, a transitory state of the rotating member 502 is shown. In this illustration, the first contact surface 516 of the second body 508 is contacting the second contact surface 518 of the rotating member 502. As the second body 508 is moved upward into the receiving cavity 506 of the first body 504, the first contact surface 516 of a first portion 514 of the second body 508 will contact with the second contact surface 518 of the rotating member 502 to urge the rotating member 502 from the first position toward the second position, which allows the first portion 514 of the second body 508 to move into the receiving cavity 506.

As the tapered first contact surface 516 moves into the receiving cavity 506, the rotating member 502 will rotate into the second position, shown in the orientation of FIG. 5C. As shown, when the rotating member 502 is in the second position, the first portion 514 of the second body 508 is free to move into the receiving cavity 506 and the rotating member 502 can align with the recess 510 of the second body 508. The force applied to the second contact surface 518 by the first contact surface 516 is no long applied and thus the rotating member 502 will rotate back toward the first position, e.g., by a biasing or spring force applied to the rotating member 502. The engaging surface 512 will then engage with the recess 510 to secure the rotating member 502 in a secured position.

In the illustration of FIG. 5D, the rotating member 502 is holding the second body 508 within or to the first body 504 in the secured position. As shown, the rotating member 502 is positioned within the recess 510 of the second body 508. In this position (a "locked position" or "secured position" of the rotating member 502) the engaging surface 512 of the rotating member 502 contacts a surface of the recess 510 and thus holds the second body 508. The engagement of the engaging surface 512 with the recess 510 will prevent the rotating member 502 from rotating all the way back to the first position.

To release or remove the second body 508 from the first body 504, a handle can be operated to force the rotating member 502 from the secured position (FIG. 5D) toward the second position FIG. 5C. When in the second position, the first portion 514 of the second body 508 can move past the rotating member 502 because the engaging surface 512 is moved out of contact with the surface of the recess 510.

Figure 6:
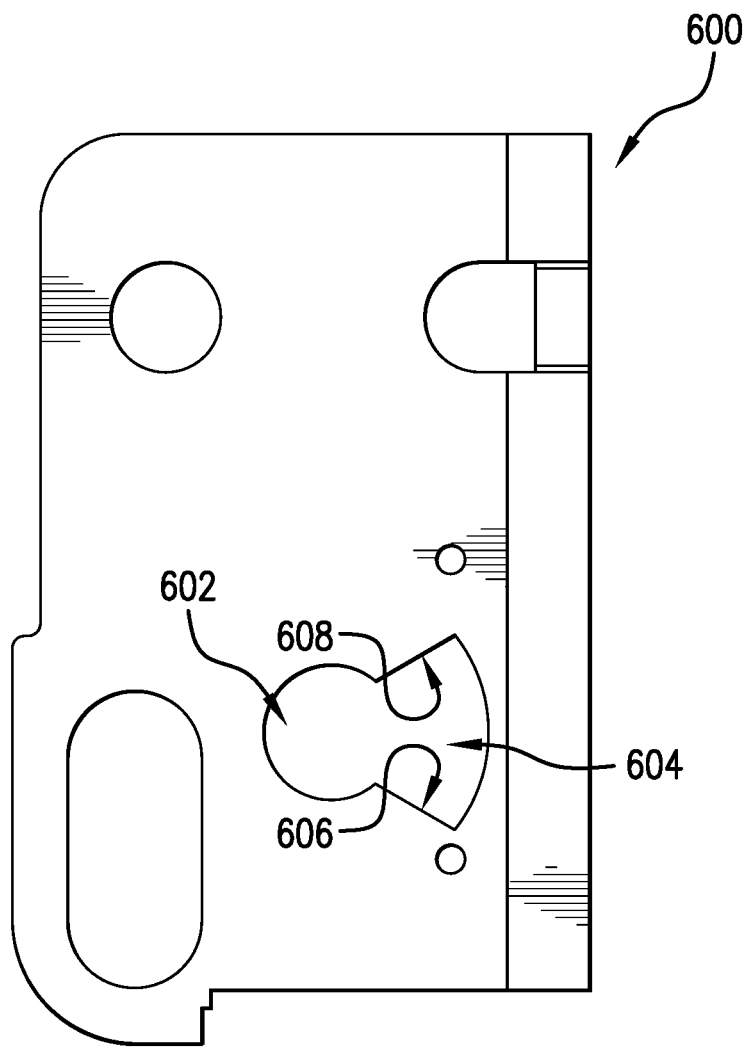
FIG. 6 is a side view illustration of a first body in accordance with an embodiment of the present disclosure.

Turning now to FIG. 6, a schematic illustration of a portion of a first body 600 in accordance with an embodiment of the present disclosure is shown. The first body 600 includes a rotating member aperture 602 and a blocking aperture 604, which are parts of a single aperture within the first body 600 in this embodiment. The rotating member aperture 602 can pass through to sides of the first body 600 such that portions of a rotating member or locking mechanism can be accessible and a portion of a rotating member extending through an interior (e.g., receiving cavity) of the first body 600.

As shown, the blocking aperture 604 has a first end 606 and a second end 608. The blocking aperture 604 is arranged to receive a portion of the rotating member that passes through the rotating member aperture 602. For example, a stop pin of the rotating member can be positioned within the blocking aperture 604 and be movable therein. In one non-limiting example, when a rotating member is installed through the rotating member aperture 602 and a stop pin is positioned within the blocking aperture 604, the rotation of the rotating member can be restricted by contact of the stop pin with the first end 606 of the blocking aperture 604. The rotating member may be urged toward a first position, with the extent of the first position being when the stop pin contacts the first end 606 of the blocking aperture 604.

The first and second ends 606, 608 of the blocking aperture 604 are arranged to provide sufficient room (e.g., large enough blocking aperture 604) to allow the stop pin to rotate enough for the flat surface (e.g., second contact surface 410 shown in FIG. 4) of the rotating member to rotate to a vertical orientation (e.g., shown in FIG. 5C). The rotating member will immediately rotate back toward the first end 606 once the recess of the second body is present and aligned with the rotating member (e.g., shown in FIG. 5D). The locked position of the rotating member and stop pin is established as the rotating member is fully tightened against the second body. When the rotating member is moved into the locked position (e.g., FIG. 5D), the stop pin will not rotate all the way back into contact with the first end 606 of the blocking aperture 604.

The blocking aperture 604 may also receive a portion of a lock. For example, the lock 222 (FIG. 2C) may include a lock pin that is insertable into the blocking aperture 604. When the lock pin is positioned within the blocking aperture, the stop pin of the rotating member may not be moveable, thus completely preventing rotation of the rotating member when the lock is engaged. However, upon disengagement of the lock, and thus removal of the lock from the blocking aperture 604, the stop pin will be movable within the blocking aperture.

In the above described embodiments, the first body is mountable to a frame or other part of a vehicle, and thus is fixed thereto. The second body is removably connectable to the first body, thus enabling removal of the second body from the first body when not required for use. However, when a user desires to two a trailing structure behind the vehicle, the second body can be inserted into the first body and secured thereto, as described herein. A third body, which extends from the first second body, can provide an engagement or attachment mechanism to attach the trailing structure to the vehicle.

Figure 7:
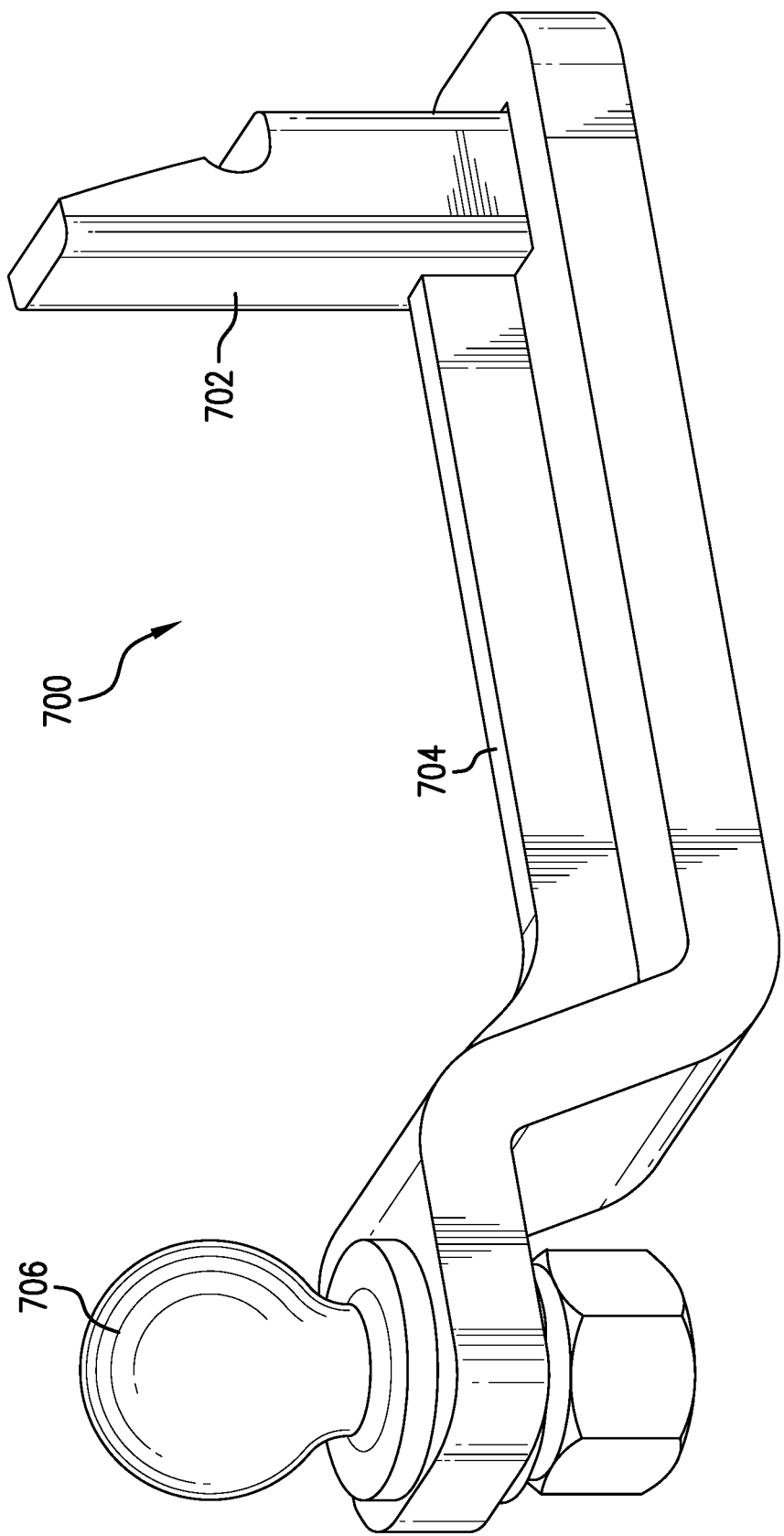
FIG. 7 is an isometric illustration of a second body and a third body arrangement in accordance with an embodiment of the present disclosure.

For example, turning now to FIG. 7, a schematic illustration of a portion of a hitch assembly 700 is shown. The hitch assembly 700 is substantially similar to that shown and described above, with a second body 702 that is releasably insertable into a first body. In this embodiment, a third body 704 is fixedly connected to the second body 702, such as by wielding or as formed as a unity body/structure. As shown, the third body 704 includes a ball mount 706 that is similar to the hitch mechanism shown in FIG. 1.

Advantageously, embodiments provided herein are directed to hitch assemblies that are at least partially releasably installable to a vehicle such that the hitch assembly can be hidden or removed when not in use. Further, latching mechanisms of the present disclosure provide tight or secure fitment between the elements that mount to a car and the elements that enable attachment and towing. This is contrast to the loose fitting pin of the standard square tube receiver. Accordingly, a "hammering" effect that is experienced due to loose fitting components (e.g., during deceleration/stopping) can be avoided. Due to this, embodiments provided herein can have higher towing capacities than typical hitch assemblies.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A hitch assembly comprising:
   a first body defining a receiving cavity;
   a second body removably insertable into the receiving cavity of the first body, the second body including a first portion and a second portion, wherein the first portion includes a tapered first contact surface and a recess, the tapered first contact surface sloping from proximate the recess toward a distal end of the first portion at an angle toward a side of the second portion opposite the recess;
   a rotating locking member rotatably mounted to the first body and extending through the receiving cavity proximate a first side thereof and rotatable between a first position and second position, the rotating locking member having a circular engaging surface and a generally flat, second contact surface wherein when the rotating locking member is rotated to the first position the generally flat second contact surface is oriented at a downward facing angle such that when the second body is inserted into the receiving cavity with the tapered first contact surface facing the rotating locking member in the first position, advancement of the tapered first contact surface of the first portion of the second body upward against the generally flat, second contact surface of the rotating locking member rotates the rotating locking member toward the second position in which the generally flat, second contact surface extends approximately vertically and until the recess in the first portion of the second body is advanced into alignment with the rotating locking member such that rotation of the rotating locking member back toward the first position advances the rotating locking member to a secured position in which a portion of the circular engaging surface of the rotating locking member is advanced into the recess in overlapping relationship with a section of the first portion of the second body surrounding the recess to secure the second body to the first body.

2. The hitch assembly of claim 1 wherein the rotating locking member is spring biased to the secured position.

3. The hitch assembly of claim 1 further comprising a handle operably connected to the rotating locking member, the handle arranged to enable manual operation of the rotating locking member from the first position to the second position.

4. The hitch assembly as in claim 1 wherein:
   the rotating locking member includes a stop feature projecting outward therefrom and the first body includes a blocking aperture formed therein, wherein the stop feature is movably positioned within the blocking aperture and first and second ends of the blocking aperture restrict rotation of the rotating locking member by stopping movement of the stop feature at the first and second ends respectively of the blocking aperture, wherein when the rotating locking member is in the first position, the stop feature is in contact with the first end of the blocking aperture and when the rotating locking member is in the second position, the stop feature is in contact with the second end of the blocking aperture; and
   the hitch assembly further comprises a lock having a lock member selectively advanceable into the blocking aperture when the rotating locking member is in the secured position to prevent the blocking feature from rotating toward the second end of the blocking aperture and preventing rotation of the rotating locking member out of the secured position.

5. A hitch assembly comprising:
   a first body fixedly attachable to a vehicle and defining a receiving cavity;
   a second body configured to operably connect to a trailing structure, the second body being removably insertable into the receiving cavity of the first body, the second body includes a first portion and a second portion, wherein the first portion includes a recess formed therein and a first contact surface extending between the recess and a distal end of the first portion and sloping toward a side of the second portion opposite the recess;

a rotating member rotatably mounted within first and second rotating member apertures formed in first and second sidewalls of the first body and extending through the receiving cavity proximate a first side thereof and rotatable between a first position and second position, the first body includes a blocking aperture formed in at least one of the first and second sidewalls adjacent to and opening into the first and second rotating member aperture respectively, a stop pin projecting from the rotating member extends into the blocking aperture, wherein the stop pin is rotatable within the blocking aperture between first and second ends of the blocking aperture which restrict rotation of the rotating member by stopping movement of the stop pin at the first and second ends respectively of the blocking aperture; wherein when the rotating member is in the first position, the stop pin is in contact with the first end of the blocking aperture and when the rotating member is in the second position, the stop pin is in contact with the second end of the blocking aperture;

the rotating member having a circular engaging surface and a second contact surface that is generally flat wherein when the rotating member is rotated to the first position the generally flat contact surface of the rotating member is oriented at a downward facing angle such that when the second body is inserted into the receiving cavity with the first contact surface facing the rotating member in the first position, advancement of the first contact surface of the first portion of the second body against the generally flat, second contact surface of the rotating member rotates the rotating member toward the second position until the recess in the first portion of the second body is advanced into alignment with the rotating member such that rotation of the rotating member back toward the first position advances the rotating member to a secured position in which a portion of the circular engaging surface of the rotating member is advanced into the recess in overlapping relationship with a section the first portion of the second body surrounding the recess to secure the second body to the first body; and a lock having a lock pin selectively advanceable into the blocking aperture when the rotating member is in the secured position to prevent the stop pin from rotating toward the second end of the blocking aperture and preventing rotation of the rotating member out of the secured position.

6. The hitch assembly of claim 5 wherein the rotating member is spring biased toward the first position.

7. The hitch assembly of claim 5 wherein the lock pin is spring biased away from the blocking aperture and the lock further includes a key enabled mechanism to selectively hold the lock pin in the blocking aperture.

\* \* \* \* \*